(12) United States Patent
Miao et al.

(10) Patent No.: US 11,873,023 B2
(45) Date of Patent: Jan. 16, 2024

(54) BOUNDARY MEMORIZATION SYSTEMS AND METHODS FOR VEHICLE POSITIONING

(71) Applicant: GM GLOBAL TECHNOLOGY OPERATIONS LLC, Detroit, MI (US)

(72) Inventors: Yun Qian Miao, Waterloo (CA); Jason J Parks, White Lake, MI (US); Norman J Weigert, Whitby (CA); Mark T Gaylord, Lake Orion, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 205 days.

(21) Appl. No.: 17/647,821

(22) Filed: Jan. 12, 2022

(65) Prior Publication Data
US 2023/0219620 A1 Jul. 13, 2023

(51) Int. Cl.
*B62D 15/02* (2006.01)
*G06T 19/20* (2011.01)
*G06V 10/70* (2022.01)
*B60W 30/06* (2006.01)

(52) U.S. Cl.
CPC .......... *B62D 15/028* (2013.01); *B60W 30/06* (2013.01); *G06T 19/20* (2013.01); *G06V 10/70* (2022.01); *G06T 2219/2012* (2013.01)

(58) Field of Classification Search
CPC . B62D 15/028; B62D 15/0285; B60W 30/06; B60W 2420/42; G06T 19/20; G06T 2219/2012; G06V 10/70; G06V 20/586; B60K 2370/11; B60Q 9/00

USPC .......................................................... 340/932.2
See application file for complete search history.

(56) References Cited

U.S. PATENT DOCUMENTS

| | | | |
|---|---|---|---|
| 8,205,704 B2* | 6/2012 | Kadowaki | B62D 15/0285 180/199 |
| 2010/0219010 A1* | 9/2010 | Kadowaki | B62D 15/0285 701/25 |
| 2016/0371983 A1* | 12/2016 | Ronning | B62D 15/027 |
| 2017/0192428 A1* | 7/2017 | Vogt | G05D 1/0257 |
| 2018/0029591 A1* | 2/2018 | Lavoie | B60W 30/06 |
| 2018/0194344 A1* | 7/2018 | Wang | G05D 1/0278 |
| 2021/0061262 A1* | 3/2021 | Kniep | B60W 30/06 |
| 2021/0162985 A1* | 6/2021 | Romero Leon | B62D 15/0285 |

FOREIGN PATENT DOCUMENTS

| | | | | |
|---|---|---|---|---|
| CN | 110654375 A | * | 1/2020 | ............ B60W 30/06 |
| CN | 115376355 A | * | 11/2022 | ............ B60W 30/06 |

* cited by examiner

*Primary Examiner* — Eric Blount
(74) *Attorney, Agent, or Firm* — Lorenz & Kopf LLP

(57) ABSTRACT

Methods and systems are provided for assisting a user with parking a vehicle in a parking space. In various embodiments a method includes: receiving, by a processor, user input indicating a position of a virtual line displayed on a display screen of the vehicle, wherein the virtual line is adjustable by a user; storing, by the processor and in a datastore, the position of the virtual line and a vehicle position associated with a parking space; and selectively displaying, by the processor, an appearance of the virtual line on the display screen when the vehicle is within a range of the vehicle position to assist a user in parking the vehicle in the parking space, wherein the selectively displaying is based on a comparison of a boundary within a scene associated with the parking space and the virtual line.

18 Claims, 6 Drawing Sheets

BOUNDARY MEMORIZATION SYSTEMS AND METHODS FOR VEHICLE POSITIONING

INTRODUCTION

The technical field generally relates to vehicles, and more particularly relates to methods and systems for memorizing landmarks and providing assistance with parking or positioning a vehicle based on the memorized landmarks.

Simple devices, such as a tennis ball hanging from a ceiling, have been commonly used to assist a driver in ensuring that the driver has parked the vehicle sufficiently within a parking space. These simple devices indicate, for example, a stopping point for a vehicle component within the space. It is desirable to provide improved methods and systems for assisting a driver in parking a vehicle and performing other positioning maneuvers. Furthermore, other desirable features and characteristics of the present invention will become apparent from the subsequent detailed description and the appended claims, taken in conjunction with the accompanying drawings and the foregoing technical field and background.

SUMMARY

Methods and systems are provided for assisting a user with parking a vehicle in a parking space. In various embodiments a method includes: receiving, by a processor, user input indicating a position of a virtual line displayed on a display screen of the vehicle, wherein the virtual line is adjustable by a user; storing, by the processor and in a datastore, the position of the virtual line and a vehicle position associated with a parking space; and selectively displaying, by the processor, an appearance of the virtual line on the display screen when the vehicle is within a range of the vehicle position to assist a user in parking the vehicle in the parking space, wherein the selectively displaying is based on a comparison of a boundary within a scene associated with the parking space and the virtual line.

In various embodiment, the method includes: detecting, by the processor, the boundary within the scene based on a machine learning technique; comparing the position of the virtual line with the position of the boundary, wherein the appearance is displayed based on the comparing.

In various embodiments, the appearance comprises an attribute of the virtual line, wherein the attribute comprises at least one of a color, a type, and a thickness of the virtual line.

In various embodiments, the position of the virtual line comprises a position relative to the boundary of a displayed scene of an environment associated with the parking space.

In various embodiments, the method includes displaying the virtual line at a first location on a second scene of the environment, and wherein the receiving the position of the virtual line is based on a user adjusting the virtual line to a second location on the second scene of the environment.

In various embodiments, the method includes displaying a tennis ball image with the virtual line, and wherein the virtual line is adjustable by way of adjusting the tennis ball image.

In various embodiments, the boundary is defined by an object and a garage floor.

In various embodiments, the boundary is defined by a garage floor and a driveway.

In various embodiments, the position of the vehicle includes a location and a heading of the vehicle.

In another embodiment, a system includes: a data storage device configured to store a position of a virtual line displayed on a display screen and a vehicle position associated with the parking space, wherein the virtual line is adjustable by a user; and a processor configured to selectively display an appearance of the virtual line on the display screen when the vehicle is within a range of the vehicle position to assist a user in parking the vehicle in the parking space, wherein the selectively displaying is based on a comparison of a boundary within a scene associated with the parking space and the virtual line.

In various embodiments, the processor is further configured to detect the boundary within the scene based on a machine learning technique, compare the position of the virtual line with the position of the boundary, and wherein the appearance is displayed based on the comparing.

In various embodiments, the appearance comprises an attribute of the virtual line, wherein the attribute comprises at least one of a color, a type, and a thickness of the virtual line.

In various embodiments, the position of the virtual line comprises a position relative to the boundary of a displayed scene of an environment associated with the parking space.

In various embodiments, the processor is further configured to display the virtual line at a first location on a second scene of the environment, and receive the position of the virtual line based on a user adjusting the virtual line to a second location on the second scene of the environment.

In various embodiments, the processor is further configured to display a tennis ball image with the virtual line, and wherein the virtual line is adjustable by way of adjusting the tennis ball image.

In various embodiments, the boundary is defined by an object and a garage floor.

In various embodiments, the boundary is defined by a garage floor and a driveway.

In various embodiments, the position of the vehicle includes a location and a heading of the vehicle.

In another embodiment, a vehicle includes: a display screen configured to display a virtual line on a scene associated with a parking space, wherein the virtual line is adjustable by a user; a data storage device configured to store a position of the virtual line displayed on the display screen and a vehicle position associated with the parking space; and a control module configured to selectively display an appearance of the virtual line on the display screen when the vehicle is within a range of the vehicle position to assist a user in parking the vehicle in the parking space, wherein the control module selectively displays the virtual line based on a comparison of a boundary within the scene associated with the parking space and the virtual line.

In various embodiments, the vehicle includes a camera configured to generate sensor data including the scene associated with the parking space.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
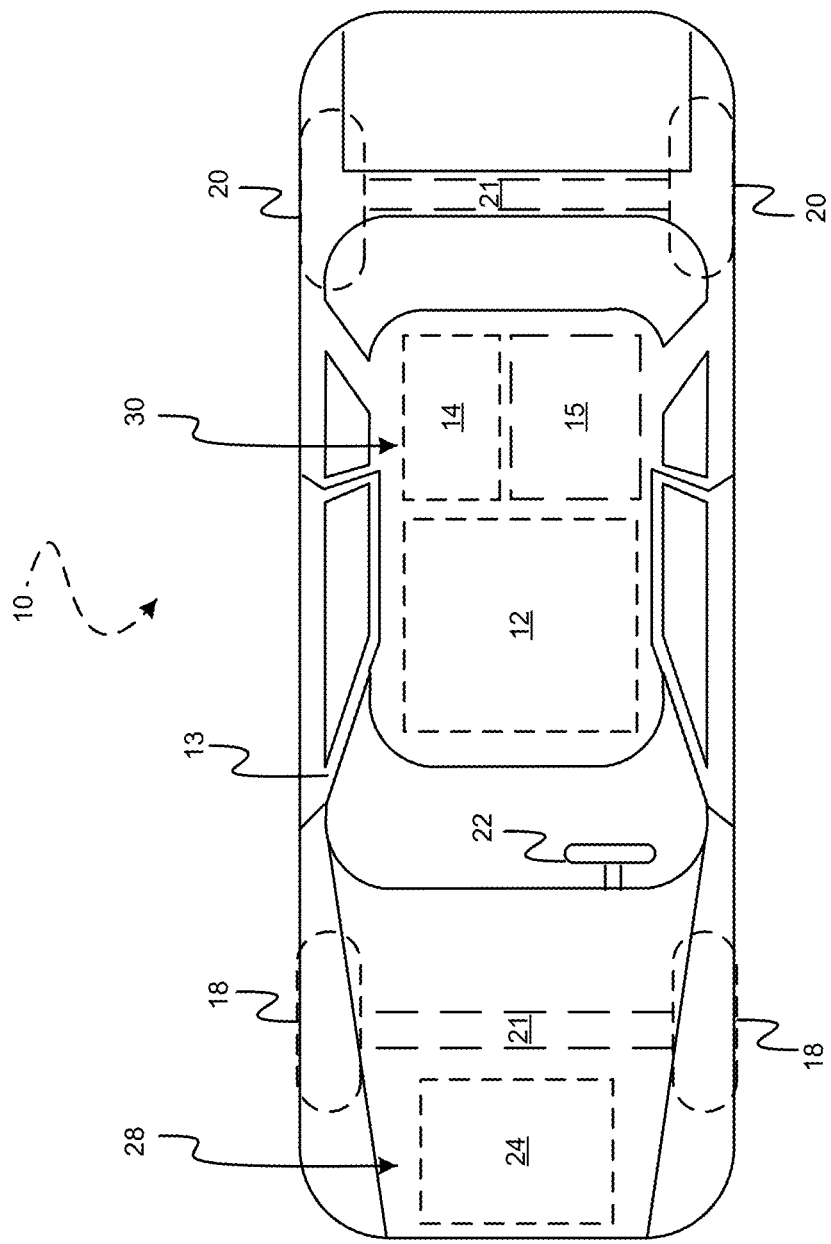
FIG. 1 is an illustration of a top perspective schematic view of a vehicle having a parking assist system in accordance with various embodiments.

The following detailed description is merely exemplary in nature and is not intended to limit the application and uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term system or module may refer to any combination or collection of mechanical and electrical hardware, software, firmware, electronic control component, processing logic, and/or processor device, individually or in any combination, including without limitation: application specific integrated circuit (ASIC), an electronic circuit, a processor (shared, dedicated, or group), memory that contains one or more executable software or firmware programs and associated data, a combinational logic circuit, and/or other suitable components that provide the described functionality.

Embodiments may be described herein in terms of functional and/or logical block components and various processing steps. It should be appreciated that such block components may be realized by any number, combination or collection of mechanical and electrical hardware, software, and/or firmware components configured to perform the specified functions. In addition, those skilled in the art will appreciate that the herein described embodiments may be practiced in conjunction with any number of mechanical and/or electronic systems, and that the vehicle systems described herein are merely exemplary.

For the sake of brevity, conventional components and techniques and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention.

FIG. 1 is an illustration of a top view of a vehicle shown generally at 10 equipped with a parking assist system shown generally at 12 in accordance with various embodiments. As will be discussed in more detail below, the parking assist system 12 generally uses data from a sensor system 14 and an operator input device 15 of the vehicle 10 to determine a desired position at designated locations within a parking space by identifying a landmark line in a sensor view. The parking assist system 10 then automatically utilizes the memorized line to guide parking to the correct position during future parking events.

Although the context of the discussion herein is with respect to the vehicle 10 being a passenger car, it should be understood that the teachings herein are compatible with all types of vehicles including, but not limited to, sedans, coupes, sport utility vehicles, pickup trucks, minivans, full-size vans, trucks, and buses as well as any type of vehicle configured to park in a space such as an aircraft, watercraft, sport utility vehicle etc. As can be appreciated, the identified landmark line may vary depending upon the type of vehicle.

For exemplary purposes, the disclosure will be discussed in the context of a landmark line being associated with a ground of a garage floor.

As shown in the example of FIG. 1, the exemplary vehicle 10 generally includes a body 13, front wheels 18, rear wheels 20, a suspension system 21, a steering system 22, and a propulsion system 24. The wheels 18-20 are each rotationally coupled to the vehicle 10 near a respective corner of the body 13. The wheels 18-20 are coupled to the body 13 via the suspension system 21. The wheels 18 and/or 20 are driven by the propulsion system 24. The wheels 18 are steerable by the steering system 22.

The body 13 is arranged on or integrated with a chassis (not shown) and substantially encloses the components of the vehicle 10. The body 13 is configured to separate a powertrain compartment 28 (that includes at least the propulsion system 24) from a passenger compartment 30 that includes, among other features, seating (not shown) for one or more occupants of the vehicle 10.

The vehicle 10 further includes the sensor system 14 and the operator selection device 15. The sensor system 14 includes one or more sensing devices that sense observable conditions of components of the vehicle 10 and/or that sense observable conditions of the exterior environment of the vehicle 10. The sensing devices can include, but are not limited to, radars, lidars, global positioning systems, optical cameras, thermal cameras, ultrasonic sensors, height sensors, pressure sensors, steering angle sensors, and/or other sensors. The operator selection device 15 includes one or more user manipulable devices that can be manipulated by a user in order to provide input. The input can relate to, for example, adjustment parameters of elements displayed on a screen. The operator selection device 15 can include a knob, a switch, a touch screen, a voice recognition module, etc.

Figure 2:
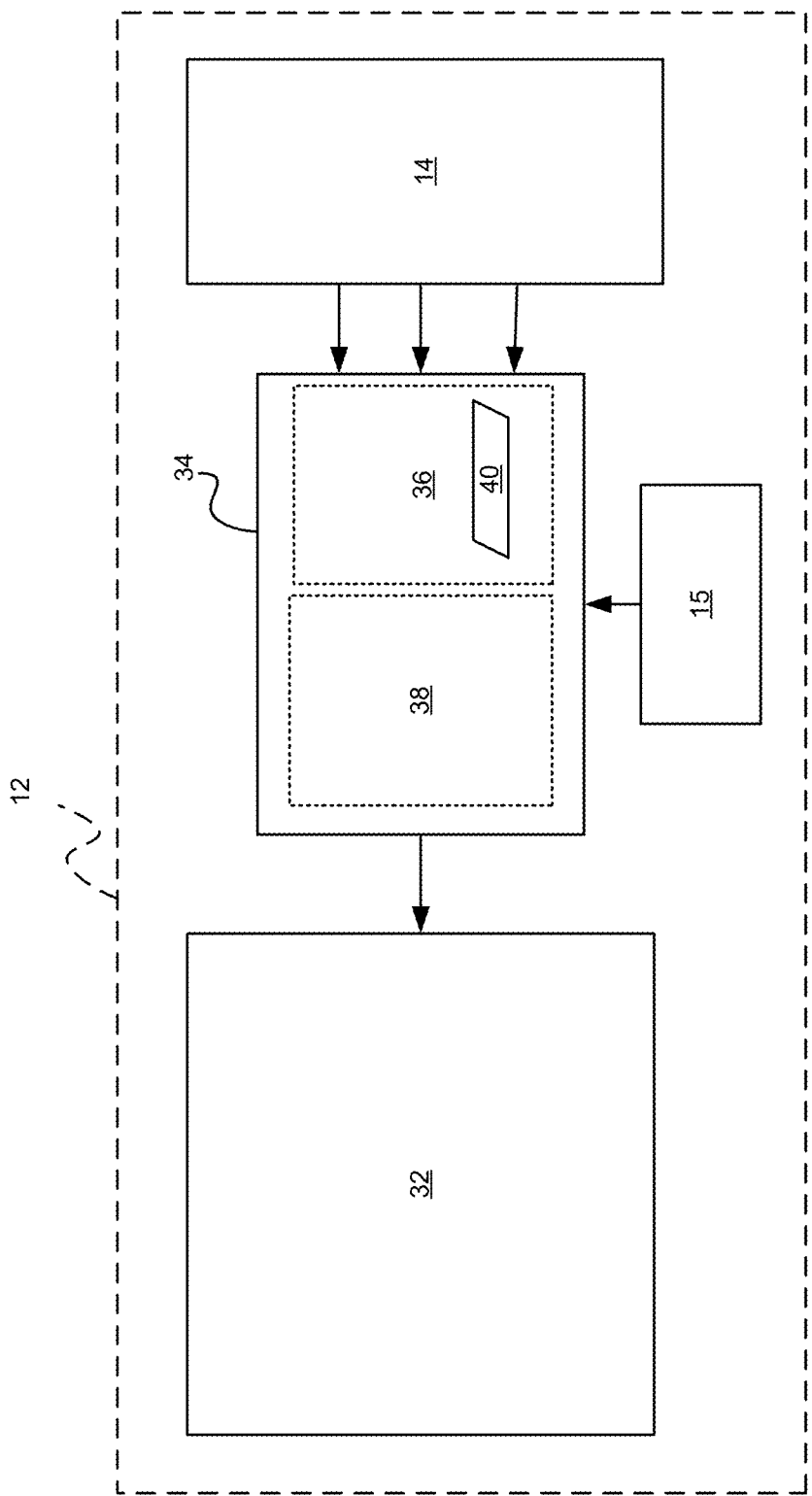
FIG. 2 is a functional block diagram illustrating a parking assist system in accordance with various embodiments.

For example, as shown in more detail in FIG. 2 and with continued reference to FIG. 1, the parking assist system 12 includes a display screen 32 communicatively coupled to a control module 34. The control module 34 is communicatively coupled to the sensor system 14 and the operator selection device 15.

The display screen 32 may be disposed within the passenger compartment 30 at a location that enables viewing by an occupant of the vehicle 10. For example, the display screen 32 may be integrated with an infotainment system (not shown) or instrument panel (not shown) of the vehicle 10. The display screen 32 displays content such that a scene associated with a parking space is viewable by the occupant.

Figure 3B:
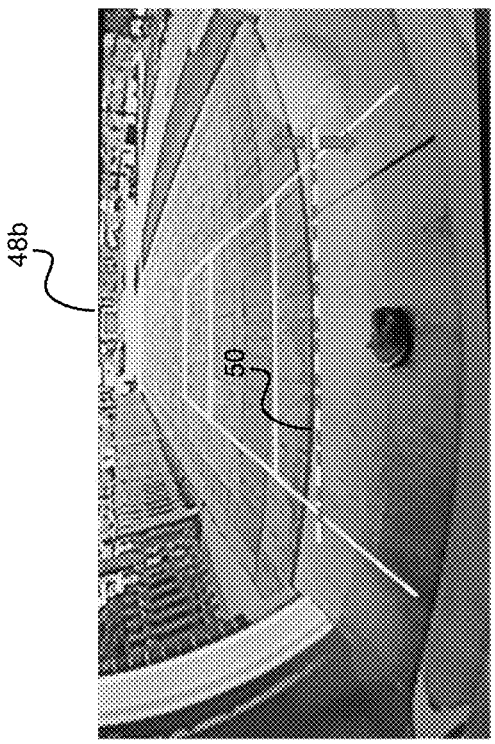
FIGS. 3A and 3B are exemplary interfaces of the parking assist system in accordance with various embodiments.
Figure 3A:
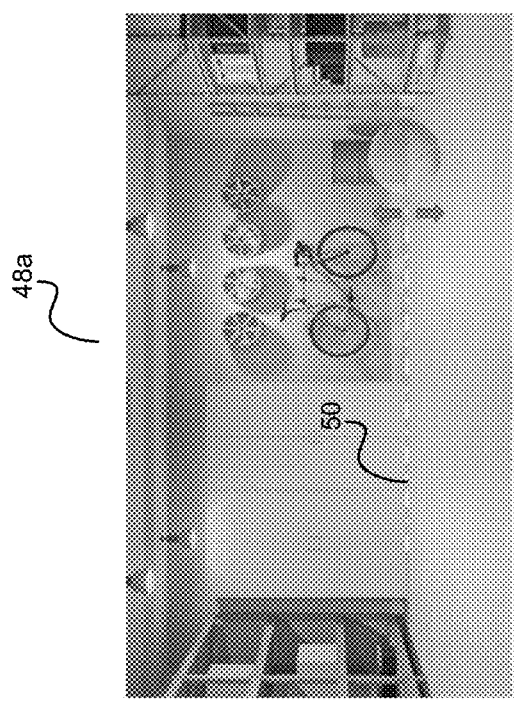

For example, as shown in FIGS. 3A and 3B, in various embodiments, the content 42 includes a depiction of a scene 48a, 48b associated with a parking space within an exemplary garage. As can be appreciated a scene can be associated with any parking space associated with various environments and is not limited to the garage. For exemplary purposes, the disclosure will be discussed in the context of a parking space within a garage.

FIG. 3A illustrates an interior scene of the garage that may be sensed when the vehicle 10 is backing into the garage. FIG. 3B illustrates the opening of the garage and a driveway that may be sensed when the vehicle 10 is pulling forward into the garage. Both scenes 48a, 48b include a ground obvious boundary of the space that may be used as a reference for parking the vehicle 10. The ground obvious boundary in FIG. 3A is shown as the line defined by cabinets meeting the garage floor. The ground obvious boundary in FIG. 3B is shown as the line between the driveway and the garage floor. As can be appreciated, in various embodiments, the ground obvious boundary may define longitudinal boundary as shown in the drawings and/or may define a lateral boundary associated with the parking space.

In various embodiments, the content 42 further includes a user adjustable virtual line 50 that is optionally associated with an image such as, but not limited to, a tennis ball. The virtual line 50 is configured to be adjustable by user input, via the operator selection device 15, to lineup with the ground boundary. As shown by the arrows in FIGS. 3A and 3B the virtual line 50 may be adjusted vertically up and down by selecting the tennis ball and dragging it up or down on the display screen 32. As can be appreciated, the virtual line 50 may alternatively or additionally be configured to be adjustable horizontally from side to side, in various embodiments, to configure lateral boundaries In various embodiments, the adjustable virtual line 50 is displayed as a solid line, a broken line, a zig-zag or wave, or any other line type having a defined appearance. In various embodiments, attributes of the appearance, such as color, line thickness, display rate, highlight, etc. is adjustable based on a comparison of the vehicle's position to a saved position, as will be discussed in more detail below. The change in appearance provides assistance to an operator of the vehicle 10 as the vehicle 10 is being parked in the parking space.

With reference back to FIG. 2, the control module 34 may be dedicated to the display screen 32, may control the display screen 32 and other features of the vehicle 10 (e.g., a body control module, an instrument control module, or other feature control module), and/or may be implemented as a combination of control modules that control the display screen 32 and other features of the vehicle 10. For exemplary purposes, the control module 34 will be discussed and illustrated as a single control module associated with the display screen 32. The control module 34 may control the display screen 32 directly and/or communicates data to the display screen 32 such that scene and the virtual line is displayed.

The control module 34 includes at least memory 36 and a processor 38. As will be discussed in more detail below, the control module 34 includes instructions that when processed by the processor 38 control the content to be displayed on the display screen 32 based on sensor data received from the sensor system 14 and/or user input received from the operator selection device 15 as will be discussed in more detail below.

Figure 4:
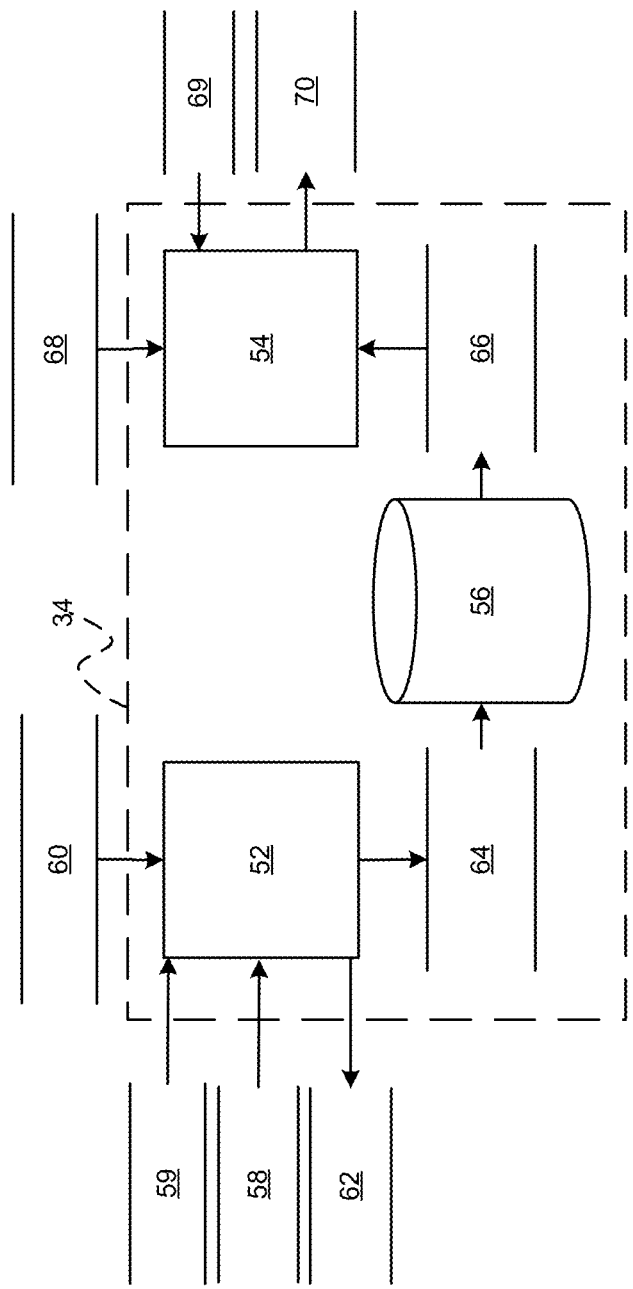
FIG. 4 is a dataflow diagram illustrating a control module of the parking assist system in accordance with various embodiments.

Referring now to FIG. 4 and with continued reference to FIGS. 1, 2, 3A, and 3B, a dataflow diagram illustrates various embodiments of the control module 34 in greater detail. Various embodiments of the control module 34 according to the present disclosure may include any number of sub-modules. As can be appreciated, the sub-modules shown in FIG. 4 may be combined and/or further partitioned to similarly generate content for display by the display screen 32 and to be viewed by an operator. Inputs to the control module 34 may be received from the sensor system 14, received from the operator selection device 15, received from other control modules (not shown) of the vehicle 10, and/or determined by other sub-modules (not shown) of the control module 34. In various embodiments, the control module 34 includes a parking position determination module 52, a parking assist display module 54, and a parking position data datastore 56.

In various embodiments, the parking position determination module 52 receives as input user input data 58, scene data 59, and vehicle position data 60. The scene data 59 includes a sensed scene (e.g., from a camera) of an environment of the vehicle 10. The vehicle position data 60 includes, for example, a location (e.g., latitude and longitude) and a posture (e.g., a heading angle) indicated by the GPS or other sensor.

Based on the inputs 58-60, the parking position determination module 52 generates display data 62 and stores parking position data 64. For example, the parking position determination module 52 receives user input data 58 indicating a user's desire to activate the parking assist feature when the vehicle 10 is parked in an optimum position in the parking space. In response, the parking position determination module 52 generates display data 62 to display the virtual line 50 overlayed on the sensed scene of the parking space.

In response to a user adjusting a position of the virtual line 50, the parking position determination module 52 receives user input data 58 indicating a position of the virtual line 50 relative to the scene shown on the display screen 32. The parking position determination module 52 associates the virtual line position with the received vehicle position data 60 at the optimum parked position and stores the associated parking position data 64 in the parking position data datastore 56 for future use.

In various embodiments, the parking assist display module 56 receives as input vehicle position data 68, and scene data 69. The vehicle position data 68 includes, for example, a location (e.g., latitude and longitude) and a posture (e.g., a heading angle) indicated by the GPS or other sensor. The scene data 69 includes a sensed scene (e.g., from a camera) of an environment of the vehicle 10.

The parking assist module 56 retrieves the stored parking data 66 from the parking position data datastore 56. The parking assist module 56 compares the received vehicle position data 68 with the vehicle position of the stored position data 66 and generates display data 70. For example, when the vehicle position matches or is within a range of the stored vehicle position, the parking assist module 56 generates display data 70 including the virtual line 50 and the sensed scene. The parking assist module 56 detects, using one or more machine learning techniques, optical features within the sensed scene, such as, the obvious ground boundary, and compares the optical feature with the position of the stored position of the virtual line 50. The parking assist module 56 adjusts the appearance attributes of the virtual line 50 based on the position of the feature relative to the virtual line 50 in the displayed scene to show progress as the vehicle 10 is parked. For example, the color of the virtual line 50 may be adjusted from green to red (or other colors) as the virtual line 50 gets closer to the identified ground boundary.

Figure 5:
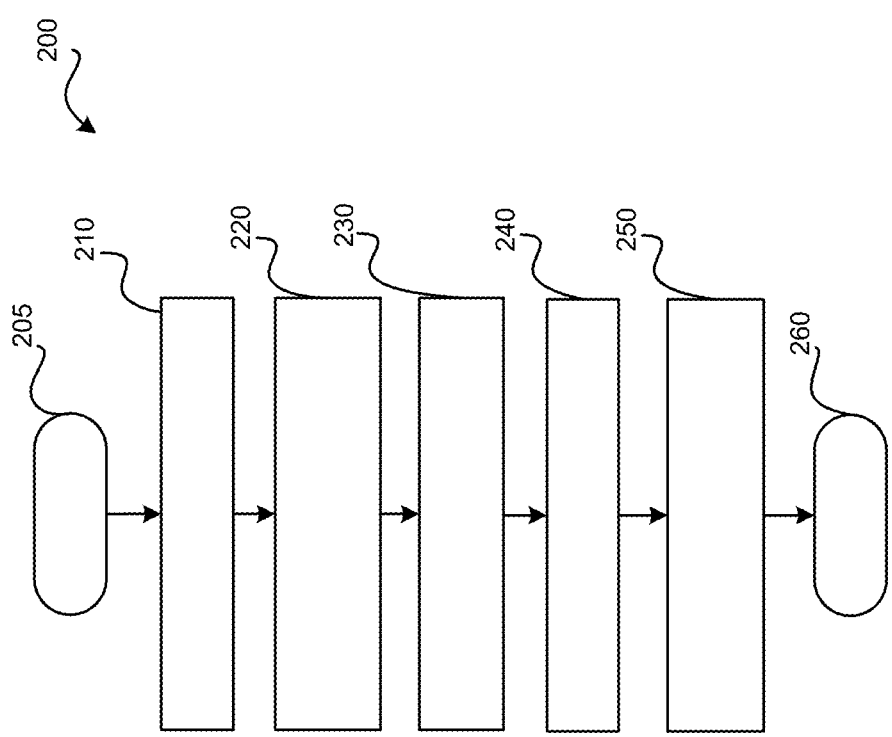
FIGS. 5 and 6 are flowcharts illustrating methods of parking assist in accordance with various embodiments.
Figure 6:
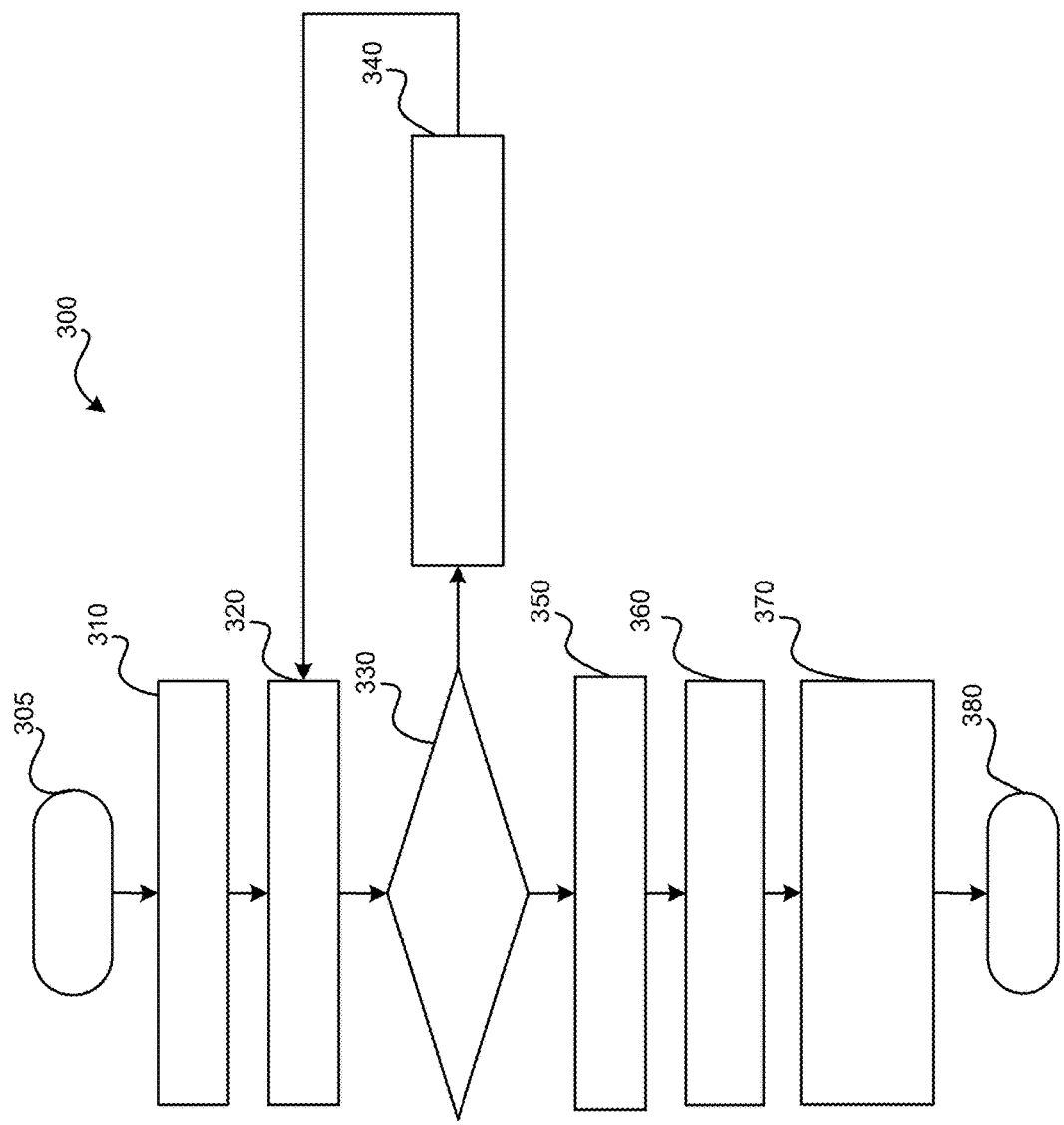

Referring now to FIGS. 5 and 6, and with continued reference to FIGS. 1-4, flowcharts illustrate a method 200 and 300 that can be performed by the parking assist system 12 in accordance with various embodiments. As can be appreciated in light of the disclosure, the order of operation within the methods 200 and 300 is not limited to the sequential execution as illustrated in FIGS. 5 and 6 but may be performed in one or more varying orders as applicable and in accordance with the present disclosure. As can further be appreciated, the methods 200 and 300 may be scheduled to run at predetermined time intervals during operation of the vehicle 10 and/or may be scheduled to run based on predetermined events.

In one example, the method 200 may be performed the first time the vehicle 10 is aligned and parked in the parking space. The method 200 may begin at 205. User input data 58 is received to activate the feature at 210. Display data 62 is generated to display the virtual line relative to a scene of the parking space at 220. User input data is received 58 indicating a position of the virtual line on the screen relative to the scene shown on the screen 230. Vehicle position data is received at 230. The position of the virtual line 50 and the position of the vehicle 10 is associated and stored in the parking position data datastore 56 at 240. Thereafter, the method 200 may end at 250.

In another example, the method 300 may be performed any other time the vehicle 10 is approaching the parking space. The method 300 may begin at 305. The stored parking position data 66 is retrieved from the datastore at 310. Vehicle position data 68 is received at 320. The vehicle position from the vehicle position data 68 is compared with the vehicle position stored in the parking position data datastore 56 at 330. When the vehicle position does not match or is not within a range of the stored vehicle position, at 330, the default scene is displayed on the display screen 32 at 340. Thereafter, the method 300 continues with receiving vehicle position data 68 at 320.

When the vehicle position matches or is within a range of the stored vehicle position at 330, the virtual line 50 is displayed on the display screen 32 at 350. Optical features near the reference line are then detected at 360 using one or more machine learning techniques. The color and/or appearance of the virtual line 50 is adjusted based on the position of the feature relative to the virtual line 50 to show progress as the vehicle 10 is parked at 370. Thereafter, the method 300 may end at 380.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for assisting a user with parking a vehicle in a parking space, comprising:
   receiving, by a processor, user input indicating a position of a virtual line displayed on a display screen of the vehicle, wherein the virtual line is adjustable by a user;
   storing, by the processor and in a datastore, the position of the virtual line and a vehicle position associated with a parking space;
   selectively displaying, by the processor, an appearance of the virtual line on the display screen when the vehicle is within a range of the vehicle position to assist a user in parking the vehicle in the parking space,
   wherein the selectively displaying is based on a comparison of a boundary within a scene associated with the parking space and the virtual line;
   detecting, by the processor, the boundary within the scene based on a machine learning technique; and
   comparing the position of the virtual line with the position of the boundary,
   wherein the appearance is displayed based on the comparing.

2. The method of claim 1, wherein the appearance comprises an attribute of the virtual line, wherein the attribute comprises at least one of a color, a type, and a thickness of the virtual line.

3. The method of claim 1, wherein the position of the virtual line comprises a position relative to the boundary of a displayed scene of an environment associated with the parking space.

4. The method of claim 3, further comprising displaying the virtual line at a first location on a second scene of the environment, and wherein the receiving the position of the virtual line is based on a user adjusting the virtual line to a second location on the second scene of the environment.

5. The method of claim 4, further comprising displaying a tennis ball image with the virtual line, and wherein the virtual line is adjustable by way of adjusting the tennis ball image.

6. The method of claim 3, wherein the boundary is defined by an object and a garage floor.

7. The method of claim 3, wherein the boundary is defined by a garage floor and a driveway.

8. The method of claim 1, wherein the position of the vehicle includes a location and a heading of the vehicle.

9. A system for assisting a user with parking a vehicle in a parking space, comprising:
   a data storage device configured to store a position of a virtual line displayed on a display screen and a vehicle position associated with the parking space, wherein the virtual line is adjustable by a user; and
   a processor configured to selectively display an appearance of the virtual line on the display screen when the vehicle is within a range of the vehicle position to assist a user in parking the vehicle in the parking space, wherein the selectively displaying is based on a comparison of a boundary within a scene associated with the parking space and the virtual line, and to detect the boundary within the scene based on a machine learning technique, compare the position of the virtual line with the position of the boundary, and wherein the appearance is displayed based on the comparing.

10. The system of claim 9, wherein the appearance comprises an attribute of the virtual line, wherein the attribute comprises at least one of a color, a type, and a thickness of the virtual line.

11. The system of claim 9, wherein the position of the virtual line comprises a position relative to the boundary of a displayed scene of an environment associated with the parking space.

12. The system of claim 11, wherein the processor is further configured to display the virtual line at a first location on a second scene of the environment, and receive the position of the virtual line based on a user adjusting the virtual line to a second location on the second scene of the environment.

13. The system of claim 12, wherein the processor is further configured to display a tennis ball image with the virtual line, and wherein the virtual line is adjustable by way of adjusting the tennis ball image.

14. The system of claim 11, wherein the boundary is defined by an object and a garage floor.

15. The system of claim 11, wherein the boundary is defined by a garage floor and a driveway.

16. The system of claim 12, wherein the position of the vehicle includes a location and a heading of the vehicle.

17. A vehicle, comprising:
a display screen configured to display a virtual line on a scene associated with a parking space, wherein the virtual line is adjustable by a user;
a data storage device configured to store a position of the virtual line displayed on the display screen and a vehicle position associated with the parking space; and
a control module configured to selectively display an appearance of the virtual line on the display screen when the vehicle is within a range of the vehicle position to assist a user in parking the vehicle in the parking space, wherein the control module selectively displays the virtual line based on a comparison of a boundary within the scene associated with the parking space and the virtual line, and to detect the boundary within the scene based on a machine learning technique, compare the position of the virtual line with the position of the boundary, and wherein the appearance is displayed based on the comparing.

18. The vehicle of claim 17 further comprising a camera configured to generate sensor data including the scene associated with the parking space.

\* \* \* \* \*